(12) United States Patent
Anderson, Jr. et al.

(10) Patent No.: US 6,226,794 B1
(45) Date of Patent: May 1, 2001

(54) SET TOP TERMINAL FOR AN INTERACTIVE INFORMATION DISTRIBUTION SYSTEM

(75) Inventors: Bruce J. Anderson, Jr., Yardville; Nadine Lamont, Somerville; Sharyn L. Drasner, Marlboro; Arthur L. Greenberg, Annandale, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 08/950,505

(22) Filed: Sep. 16, 1997

Related U.S. Application Data
(60) Provisional application No. 60/026,229, filed on Sep. 17, 1996.

(51) Int. Cl.[7] .................................................. H04N 7/173
(52) U.S. Cl. ............................ 725/131; 725/116; 725/126
(58) Field of Search .................................. 348/10, 12, 13; 455/6.1, 5.1, 6.2; 709/217, 219

(56) References Cited

U.S. PATENT DOCUMENTS

| | | | |
|---|---|---|---|
| 4,538,174 | 8/1985 | Gargini et al. | 358/86 |
| 4,553,161 | 11/1985 | Citta | 358/86 |
| 4,987,486 | 1/1991 | Johnson et al. | 358/86 |
| 5,408,259 | 4/1995 | Warick | 348/6 |
| 5,408,260 | 4/1995 | Arnon | 348/6 |
| 5,477,263 | 12/1995 | O'Callaghan et al. | 348/7 |
| 5,481,542 | * 1/1996 | Logston et al. | 370/94.2 |
| 5,499,047 | 3/1996 | Terry et al. | 348/6 |
| 5,535,206 | 7/1996 | Bestler et al. | 370/79 |
| 5,594,492 | 1/1997 | O'Callaghan et al. | 348/10 |
| 5,638,112 | * 6/1997 | Bestler et al. | 348/10 |
| 5,661,517 | 8/1997 | Budow et al. | 348/13 |
| 5,729,279 | * 3/1998 | Fuller | 348/8 |
| 5,754,941 | * 5/1998 | Sharpe et al. | 455/5.1 |
| 5,867,485 | * 6/1996 | Chambers et al. | 370/281 |
| 5,963,557 | * 10/1999 | Eng | 370/432 |
| 5,990,927 | * 12/1993 | Hendricks et al. | 348/6 |

FOREIGN PATENT DOCUMENTS

| | | | |
|---|---|---|---|
| 0 730 382 | 9/1996 | (EP) | H04N/7/173 |
| 92/17027 | 10/1992 | (WO) | H04N/7/00 |

* cited by examiner

Primary Examiner—Andrew I. Faile
Assistant Examiner—Kieu-Oanh Bui
(74) Attorney, Agent, or Firm—William J. Burke

(57) ABSTRACT

A set top terminal for receiving information transmitted from a service provider, for receiving control information transmitted by a service provider, and for transmitting control information from the set top terminal to the service provider to interactively control the services that are being received. The set top terminal receives display images via an information channel carrying both conventional analog cable television signals and digital television signals. Additionally, set top terminal control signals are sent from the service provider via a command channel and the set top terminal sends control signals to the service provider via a back channel.

23 Claims, 5 Drawing Sheets

SET TOP TERMINAL FOR AN INTERACTIVE INFORMATION DISTRIBUTION SYSTEM

This application claims benefit of U.S. provisional application No. 60/026,229, filed Sep. 17, 1996.

The present invention relates to an interactive information distribution system and, more particularly, to a set top terminal for interactively communicating with the information distribution system.

BACKGROUND OF THE INVENTION

Recent advances in digital signal processing techniques and, in particular, advances in digital compression techniques, have led to a plethora of proposals for providing new digital services to a subscribers home via existing telephone and coaxial networks. For example, it has been proposed to provide hundreds of cable television channels to subscribers by compressing digital video, transmitting the compressed digital video over conventional coaxial cable television cables, and then decompressing the video at the subscriber's set top terminal. Another proposed application of this technology is a movie-on-demand system in which a subscriber communicates directly to the video service provider via telephone lines to request a particular video program from a video library and the requested video program is routed to the subscriber's home via telephone lines or via coaxial television cables for immediate viewing.

However, these present movie-on-demand video systems are not truly interactive systems wherein a subscriber can selectively access a large audio, video or data library and control the presentation of the selected information on a real time basis, as when a video program is played back using the viewer's conventional video cassette recorder. Most of the presently available systems have a simple control interface that permits the subscriber to merely order information without any further control of the presentation of the information. Typically the set top terminals in these forms of systems merely demodulate the signal from the cable network and present them to the viewer on the viewer's conventional television. Control information from the set top terminal to the service provider is typically carried by the telephone network. As such, only rudimentary commands are permitted, otherwise a dedicated telephone line would be necessary.

Therefore, there is a need in the art for a set top terminal that is capable of interacting with an interactive information distribution system to provide real time interaction with the services provided by the service provider.

SUMMARY OF THE INVENTION

The disadvantages heretofore associated with the prior art are overcome by the present invention. The present invention is a set top terminal for receiving information transmitted from a service provider, for receiving control information transmitted by a service provider, and for transmitting control information from the set top terminal to the service provider to interactively control the services that are being received. More specifically, the set top terminal receives in-band information from the service provider, e.g., menu images, data, video, audio, and the like, in a frequency band of 50–750 MHz. The control information transmitted by the set top terminal is carried in a frequency band of 15.5 to 29.5 MHz. As such, the set top terminal communicates using three independent communications channels: (a) an information channel; (2) a command channel; and (3) a back channel. The back channel information is modulated by the set top terminal using a binary phase shift key (BPSK) modulator. The command channel of control information received by the set top terminal from the network is transmitted using quadrature phase shift key (QPSK) modulation. The broadband information carried by the information channel is modulated using either quadrature amplitude modulation (QAM) or a conventional analog modulated television signal modulation scheme such as NTSC, PAL, or SECAM. Prior to being modulated into a carrier frequency, both the command channel data and the information channel data are packetized using a transport protocol such as the Moving Pictures Experts Group transport protocol, a modified version of this protocol, or some other protocol that facilitates packet addressing and routing.

More specifically, the set top terminal of the present invention contains a diplexer that is coupled at its input to an RF feed from a source of video and control information. The diplexer has a single feed path to be used by the back channel, the command channel and the information channel. The diplexer, which acts as a T filter, couples the signal from the RF feed to a signal splitter that, in turn, couples the signal to two tuners (one tuner for the command channel signals and one tuner for the information channel signals). The command channel tuner and demodulator select a particular frequency carrying command channel information for the particular set top terminal, demodulate that information, depacketize the data and provide a data stream of control information to a microprocessor that controls the set top terminal.

The tuner for the information channel selects a particular channel on which information for the set top terminal is received and converts the RF signal to an IF signal. The IF signal, if it is an analog video signal, is processed by an NTSC demodulator in a conventional manner. Parallel to the NTSC demodulator is a digital television signal demodulator that demodulates QAM modulation, extracts data packets addressed to this set top terminal using an information channel transport decoder and finally, decodes the compressed video using an MPEG decoder to produce both digital video and digital audio signals. The digital video signal is then encoded using an NTSC encoder to produce a luminance and chrominance signal that is multiplexed and modulated using an RF modulator to generate a composite video signal on channel 3/4 for reception by a conventional television. In addition, there is an S video output, a composite video output and stereo audio output. To control the information, the user manipulates an infrared remote control to send commands to the set top terminal which has an infrared receiver that digitizes the information and couples it to a data/address bus for the microprocessor. The information on the bus is processed by the microprocessor, formatted into transmittable data which is modulated onto a carrier using the BPSK back channel modulator. The output of the modulator is amplified and coupled to the diplexer such that a single path input into the set top terminal is used for both transmitting and receiving information. The power level and transmission frequency used by the set top terminal are controlled by the microprocessor.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common within the figure.

DETAILED DESCRIPTION

Figure 1:
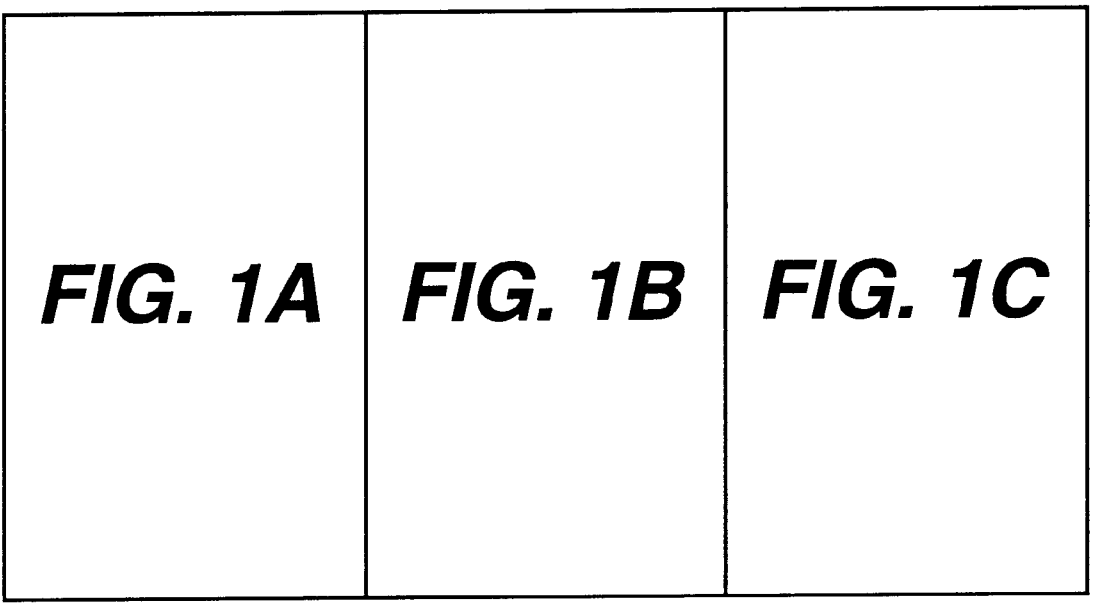
FIG. 1 depicts a high level block diagram of a set top terminal in accordance with the present invention.
Figure 1A:
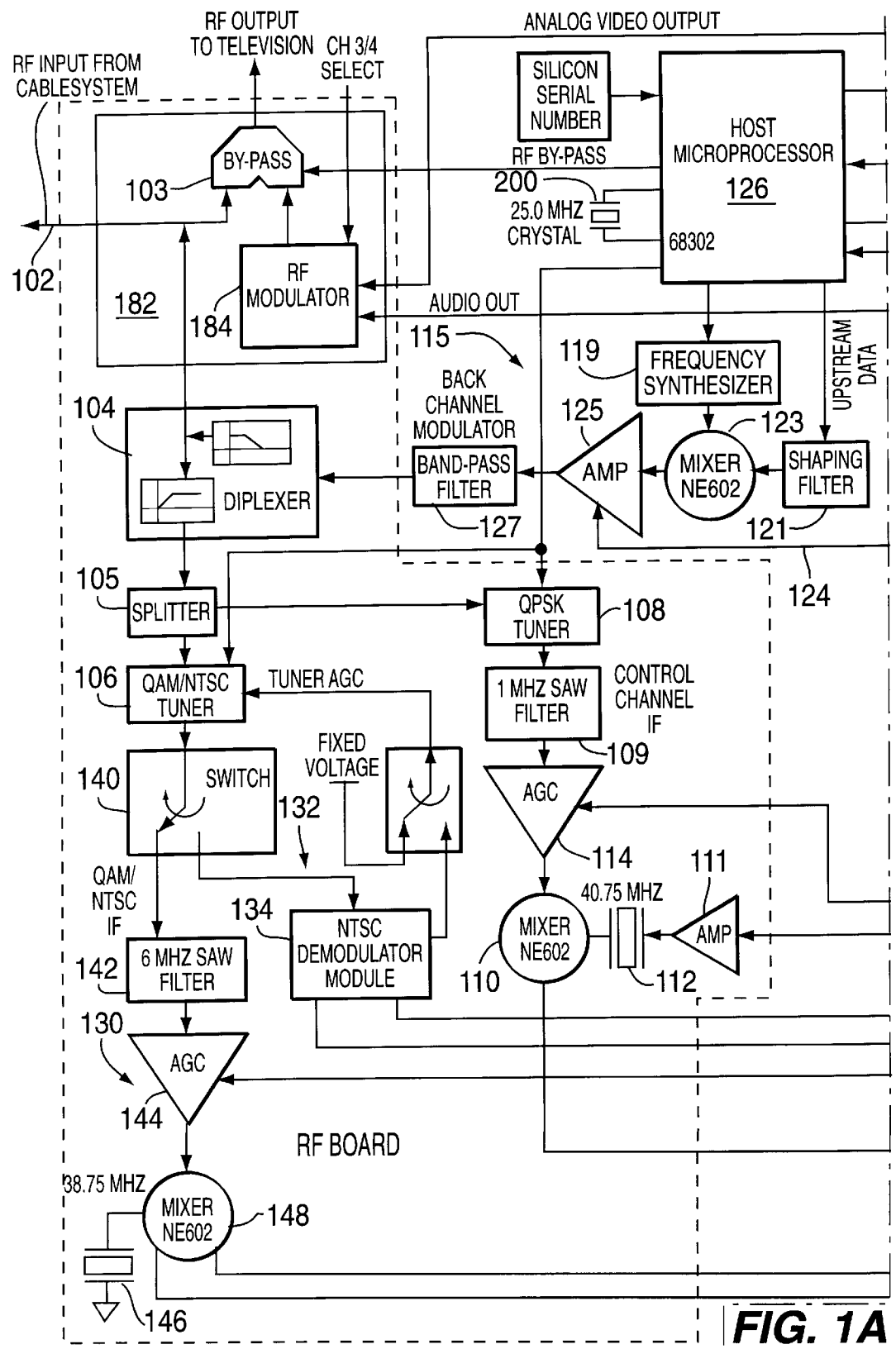
Figure 1B:
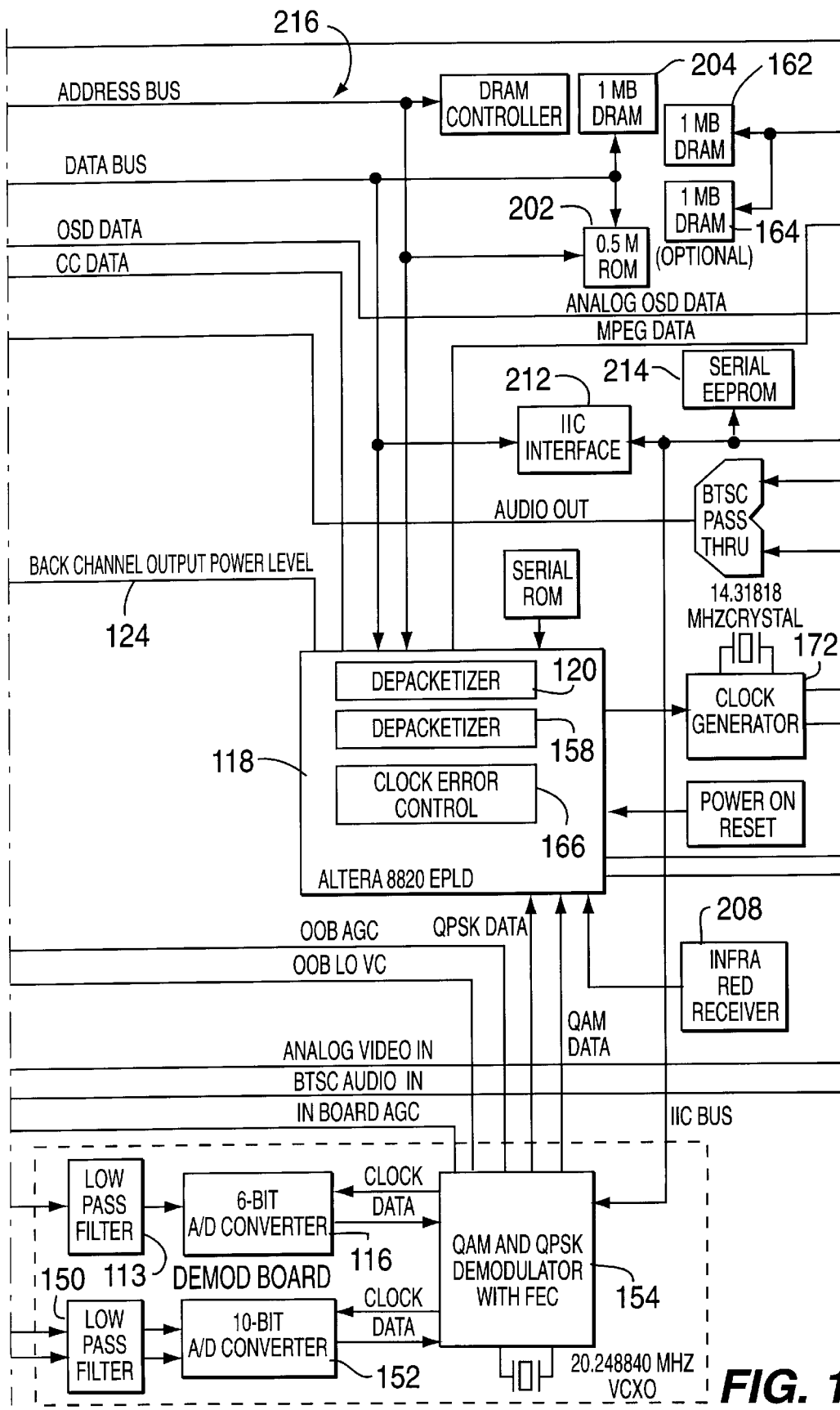
Figure 1C:
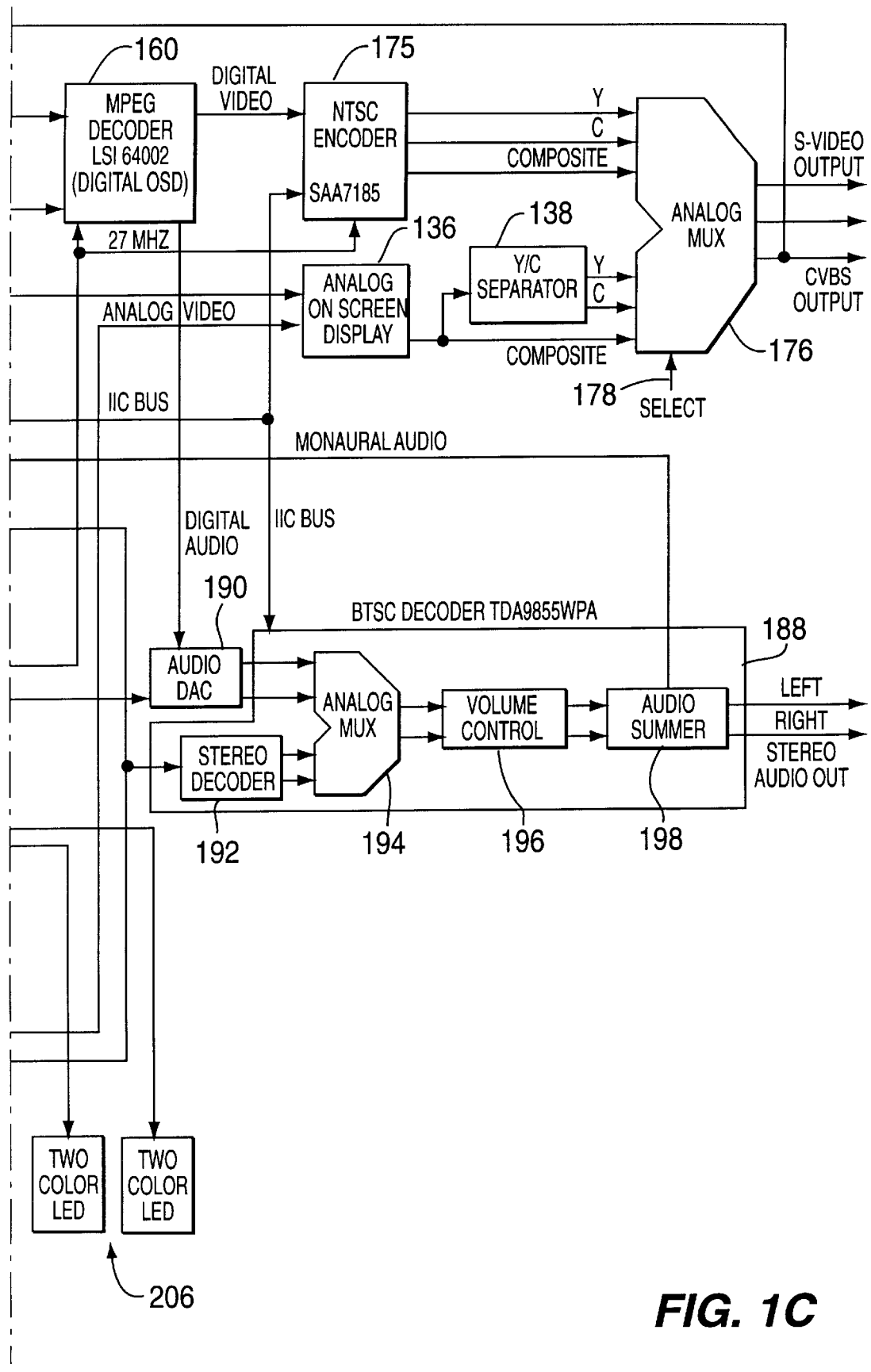

FIG. 1 depicts a block diagram of the set top terminal 100 of the present invention. The set top terminal contains an input port 102 that is coupled to a conventional cable or hybrid fiber-cable coax network (not shown). This network carries an information channel, a command channel, and a back channel. The information channel carries both analog signals (e.g., conventional cable television signals) and digital signals (e.g., interactive television signals). Specifically, at the distal end of the network is a interactive information service provider equipment that provides requested information and analog television signal via the information channel as well as command and control information for the set top terminal on the command channel. The service provider equipment also accepts requests and commands from the set top terminal transmitted via the back channel. The back channel information is generally carried using a frequency within the band 15.5 to 29.5 MHz. The command channel information is generally carried on a carrier in the 70 to 110 MHz band, but can be transmitted on any frequency in the 50–750 MHz band. The information channel occupies the band from 50 to 750 MHz. All these channels are propagated through a single network using frequency multiplexing.

An analog signal multiplexer 103 has one input coupled to input port 102 and a second input coupled to an RF modulator 184. This "bypass" multiplexer couples either the input port RF signal directly to a television or couples a channel 3/4 modulated signal to the television. The information carried by the channel 3/4 modulated signal are described below.

A diplexer 104 is a T filter that couples the back channel signal from the back channel modulator 115 onto the RF feed path to port 102 and passes the information channel and the command channel through the diplexer to their respective tuners 106 and 108. An RF splitter 105 is coupled to the output of the diplexer 104. The splitter couples the RF signal to both the command channel tuner 108 and the information channel tuner 106.

The command channel tuner 108 is software selectable tuning such that the set top terminal once installed has a particular frequency upon which it will receive all of its command channel information, but this frequency can be changed via commands from the service provider. The modulation received via the command channel is quadrature phase shift keyed (QPSK) having a data rate of 1 megabit per second. The data is carried using a modified MPEG-2 transport packet format subdivided into 23 byte cells. After packetizing and forward error correcting the information the effective bandwidth of the channel is 750 kilobits per second. The tuner selects one frequency within a number of available frequencies for demodulation. The IF signal from the tuner is filtered by a 1 MHz SAW filter 109 and amplified by AGC amplifier 114. A mixer 110 downconverts an RF signal from the jumper selectable tuner by mixing the output of the selectable tuner with a 40.75 MHz signal from a VCXO 112. Mixer 110 produces a baseband signal that is then filtered by a low pass filter 113. The amplified signal is then converted into a digital signal using a 6-bit analog-to-digital converter (ADC) 116 that produces a sequence of 6bit sample of the baseband command channel signal at a 2 MHz sampling rate. The digitized signal is coupled to a conventional QPSK demodulator 154. The QPSK demodulator also controls the VCXO 112 via a control signal amplified by amplifier 111. The QPSK demodulator is available within a demodulator integrated circuit available from Broadcom as model BCM3115.

Figure 3:
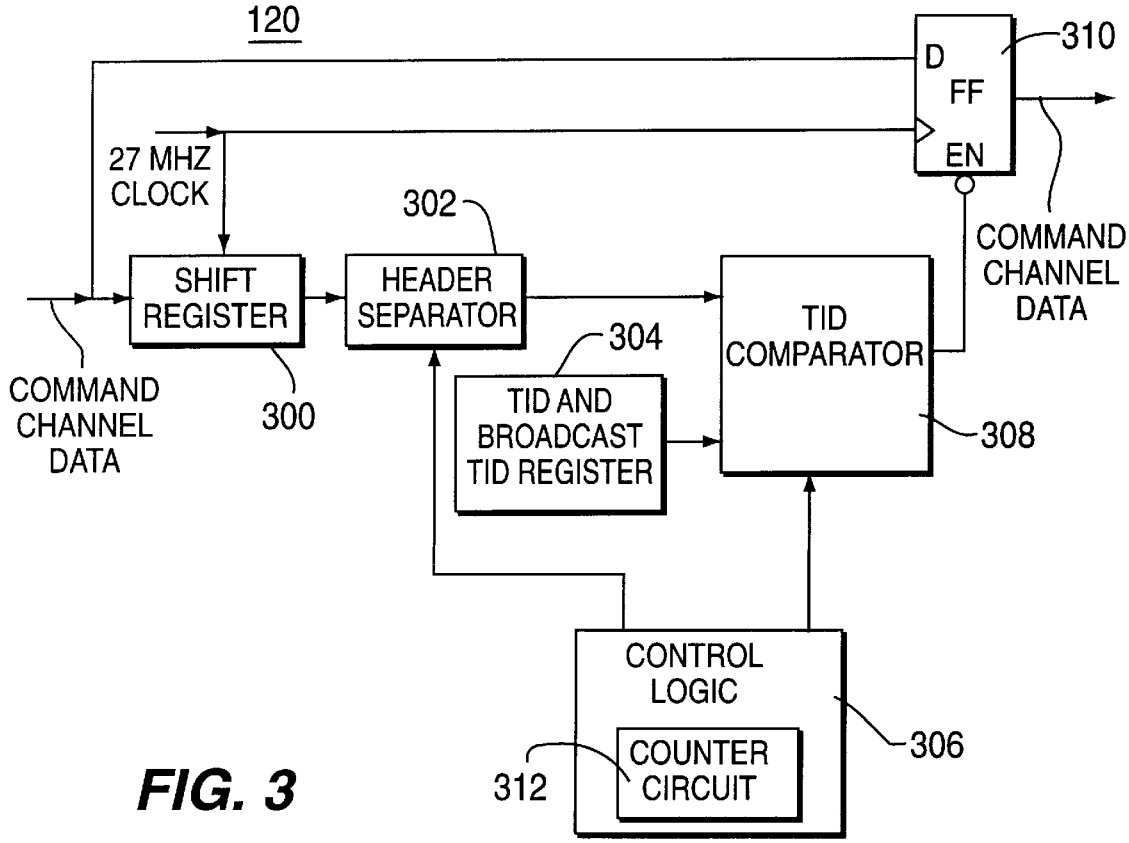
FIG. 3 depicts a block diagram of a command channel transport depacketizer.

To complete the demodulation of the QPSK signal and recover the command channel data, the output of the QPSK demodulator is processed (e.g., depacketized) by a portion of a field programmable gate array 120. The command channel depacketizer is discussed in detail with respect to FIG. 3 below. The depacketizer is implemented within a field programmable gate array (FPGA) 118 such as the model 8820 EPLD available from Altera. This FPGA is used to implement other circuits within the set top terminal including an address decoder, an interrupt controller, a clock divider, a switch controller, an LED controller, an IR receiver controller, an information channel depacketizer, a back channel modulator controller, and a 27 MHz clock error control circuit.

The command channel data is carried within a packetized signal using a modified MPEG transport protocol. Specifically, the command channel data is carried as a payload of a packet having 4 bytes of transport header and 184 bytes of payload data. The payload comprises a plurality of various length blocks of data. Each block is preceded by a 16 bit address and an 8 bit length designator. The block of data generally contains an acknowledge sequence, message number, data, and a CRC for the data. Once depacketized the block of data is coupled to the 16-bit microprocessor 126. The microprocessor 126 implements any instructions that are contained in the data stream.

To synchronize the depacketizing process, the command channel signal depacketizer finds the synchronization code in the transport packet header and confirms that it has an 0x47 value. Once the correct code is determine, the depacketizer looks at the synchronization code field in the transport header every 188 bytes. If the 0x47 value is not found in the header, the depacketizer awaits the next header to resynchronize. Once synchronized, the depacketizer ignores all other information in the transport header. The depacketizer compares the 16-bit address in each of the data blocks. If a block has an address that matches an address established by the microprocessor, the block is passed to the microprocessor. All other blocks are ignored.

The IF output signal from tuner 106 is coupled, through switch 140, to both a digital signal demodulator circuit 130 as well as an analog signal demodulator 132. The analog demodulator contains a conventional NTSC signal demodulator module 134, an on-screen display (OSD) unit 136 and a Y/C separator 138. The output of the NTSC demodulator module 134 is a baseband video signal as well as a baseband audio signal. The baseband video is coupled to the OSD unit 136 that accepts commands from the microprocessor such that OSD functionality is provided in a conventional manner. The combined baseband video signal as well as the OSD information is coupled to the Y/C separator 138. The Y/C separator 138 generates a luminance signal and a chrominance signal derived from the baseband video. Thus, the inventive set top terminal demodulates all available conventional NTSC cable television channels in addition to the interactive services described below. Similar circuitry would be used for demodulating signals using other analog television formats such as PAL or SECAM.

The digital demodulator 130 contains a SAW filter 142 having a 6 MHz bandwidth and an amplifier 144. The SAW filter band limits the IF signal from the tuner 106. The amplifier 144 is gain controlled by the demodulator 154 to compensate for the insertion loss of the SAW filter 142 and input signal amplitude variations. The output of the amplifier 144 is coupled to a mixer 148 which combines a 38.75 MHz generated by the oscillator 146 with the IF signal to produce a complex output signal, i.e., a signal having in-phase and quadrature components. The complex signal is filtered by low pass filter 150 and then analog-to-digital (A/D) converted by 10-bit A/D converter 152. The A/D converter 152 produces a digital representation of the complex signal generated by low pass filter 150.

The output signal for the A/D converter is coupled to a QAM demodulator integrated circuit available from Broadcom as model BCM3115. This demodulator is supported by a 20.248840 MHz voltage controlled crystal oscillator (VCXO). The demodulated signal from the demodulator 154 is coupled to the information channel transport depacketizer 158. The information channel transport depacketizer 158 is further described with reference to FIG. 2 below. Suffice it to say that this depacketizer removes the transport packet headers and disregards any irrelevant programming material that is not addressed to this particular set top terminal. The output from the transport depacketizer 158 is a program stream containing requested programming for the subscriber using this particular set top terminal.

The program stream is coupled to compressed video decoder 160 (e.g., an MPEG decoder) which is available from LSI Logic as model LSI64002. The MPEG decoder is supported by one megabit of random access memory 162 and an optional additional one megabit memory 164. The MPEG decoder 160 is also supported by a clock generator 166 that supplies the decoder with a stable 27 MHz reference. The output signals of the MPEG decoder are a digital video signal and a digital audio signal.

The generator is coupled to a portion of the field programmable gate array 118 that is programmed as a clock error control circuit 166. In operation, the clock error control circuit 166 compares the local SCR information that is produced by the microprocessor 126 with the SCR generated by the MPEG decoder. The decoded SCR information is extracted from the program material by the MPEG decoder. The difference between the local SCR and the extracted SCR generates an error signal indicative of timing error between the service provider and the set top terminal. The error signal coupled as a control voltage to the 27 MHz clock generator 172 (Microclock model number MT 27701-015). The clock generator 172 derives the 27 MHz signal from a signal generated by a 14.31818 MHz oscillator. The frequency locked 27 MHz signal is used by the transport depacketizer 158, the NTSC encoder 175 and the MPEG decoder 160 to produce the video and audio signals carried by the information channel. Additionally, a clock divider which is part of the field programmable gate array 118 is used for generating an audio clock derived from the 27 MHz reference clock.

The digital video signal is coupled to an NTSC encoder 175 which is available from Phillips Consumer Electronics as model SAA7185. This encoder uses the digital video as well as the 27 MHz clock to generate luminance and chrominance signals as well as a composite video signal. The output signals from the NTSC encoder 175 are coupled to one input of an analog multiplexer 176. The other input pair to the analog multiplexer 176 is generated by the Y/C separator 138. The multiplexer, under control of a video output selection line 178, selects either the luminance and chrominance signals as well as the composite video generated from the digital video or the luminance and chrominance signals as well as the composite video generated from the analog video signals as an output signal for the set top terminal (e.g., an S-video output).

The composite video output of the analog multiplexer 176 is coupled to an RF modulator 182. The RF modulator is controlled by a channel 3/4 selection signal that informs the RF modulator on which television channel the output signal should be modulated. In response to this signal, the RF modulator 182 upconverts the composite video signal to either channel 3 or channel 4 of the broadcast television band. The upconverted signal is coupled to the second input of multiplexer 103.

The audio signals (both baseband audio from the analog signal and digital audio from the digital signal) are processed by the audio decoder 188 which is available from Philips Consumer Electronics as model number TTA9855WPA. The digital audio from the MPEG decoder is coupled to an audio digital-to-analog converter (D/A) 190 which converts the digital audio signal into an analog audio signal and couples it to an analog multiplexer 194 within the audio decoder 188. The audio decoder contains a stereo decoder 192, an analog multiplexer 194, a volume control unit 196 and an audio summer 198. The stereo decoder operates on the baseband audio from the NTSC demodulator and provides a stereo audio output signal that is coupled to one input of the analog multiplexer 194. The other input of the analog multiplexer 194 is the stereo analog signal derived from the digital audio. The analog multiplexer selects, under control of the microprocessor 126 via the I$^2$C control 212, either of the audio channels that corresponds to the video that is then being presented to the output ports of the set top terminal. The output signal from the analog multiplexer is coupled to a volume control unit 196 and, in turn, to an audio summer 198. The summer 198 passes the stereo audio output to the output ports of the set top terminal as well as providing a monophonic audio signal to the RF modulator. The monophonic audio is combined with the video signal and generated as an RF output signal on either channel 3 or channel 4. This RF output signal is a broadcast television signal containing both video and audio information in NTSC format.

The 16-bit microprocessor 126 is supported by 25 MHz crystal 200, an instruction read only memory (ROM) 202, random access memory (RAM) 204, a light emitting diode (LED) indicators 206, and an infrared receiver 208. The ROM 202 and RAM 204 as well as an I$^2$C controller 212, an EEPROM 214 and the FPGA 118 are coupled to a data and address buses 216 that are used for interconnecting the various digital control components of the set top terminal.

The subscriber instructions are coupled from the IR receiver 208 to the FPGA 118 and, ultimately, to the microprocessor 126. If the instruction can be implemented locally (e.g., change channel, power on/off, volume control, and the like), the microprocessor 126 directly implements the command. However, if the instruction requires interaction with the service provider equipment (e.g., a new interactive menu, movie selection, system queries regarding billing and the like), the microprocessor transmits the instruction to the service provider via the back channel.

Specifically, the instruction is digitally modulated onto a carrier frequency using BPSK modulation. The BPSK modulator 115 contains a data shaping filter 121, a mixer 123 driven by a synthesizer 119, a power amplifier 125 and a bandpass filter 127. The mixer 123 upconverts the shaped data using a frequency from synthesizer 119. The frequency and power level used by the modulator are established by the microprocessor 126 via signals on a control lines 124 and 125. The frequency and power level are typically set in response to commands from the service provider equipment that are sent via the command channel. The LED 206 is driven by the FPGA 118 to indicate when the set top terminal is activated as well as other operational states. The infrared receiver 208 receives command and control instructions from an infrared remote control unit used by the subscriber.

The set top terminal of FIG. 1 demodulates both NTSC formatted analog television signals as well as digital television signals. In addition, the set top terminal receives command and control information through a command channel and generates back channel information using a back channel modulator. As such, a single set top terminal performs extensive functions to present and manipulate video information as displayed on a conventional television set.

Figure 2:
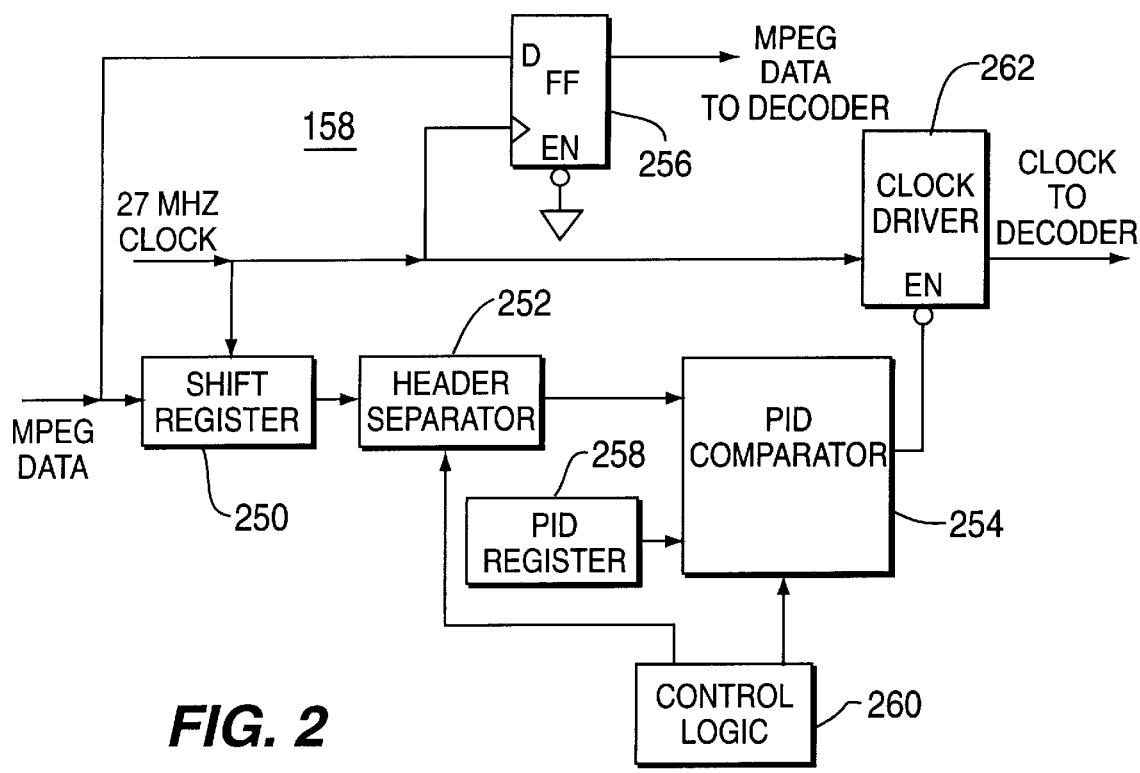
FIG. 2 depicts a detailed block diagram of an information channel transport depacketizer.

FIG. 2 is a detailed block diagram of the information channel transport depacketizer 158 implemented as part of the FPGA 118. The transport depacketizer 158 contains an shift register 250, a header separator 252, a comparator 254, a D flip-flop 256, a program identification (PID) register 258, control logic 260, and clock driver 262 (a circuit that is outside of the FPGA 118 and contained in clock generator 172). The MPEG transport packet stream is coupled to the shift register 250 as well as the D terminal of the D flip-flop 256. The D flip-flop has its enable port grounded such that the flip-flop clocks all the transport stream data through to the MPEG decoder. The shift register buffers the transport packet and couples the packet information to the header separator 252 which removes the transport header from the transport packet stream in a conventional manner. The output from the header separator is coupled to one input of a comparator 254. The PID register 258 contains the program identification code for the program that is to be received by the set top terminal. A PID is contained within each transport stream packet. The comparator 254 compares the program identification code stored in the PID register 258 with the PID of each packet within the program stream generated from the header separator 252. When a comparison occurs that indicates the PID in a packet is the same as the PID of the PID register, the comparator 254 activates the enable port of the clock driver 262 (e.g., a clock driver that can be activated and deactivated). In response to the comparator output signal, the clock driver couples the 27 MHz clock to the MPEG decoder 160. If the PIDs do not match, the clock driver does not couple the clock to the decoder and the decoder does not function. As such, the data is packets that are not carrying the appropriate PID are ignored. Alternatively, the comparator output signal could be coupled to the enable port of the D flip-flop and control passage of the MPEG data to the decoder instead of controlling the clock availability.

To facilitate efficient operation of the information channel transport depacketizer 158 as implemented in an FPGA, the control logic 260 causes the PID comparison to be accomplished in two steps. Although a one step (13-bit) comparison is possible, it is more efficient to first compare five most significant bits (MSB) of the PIDs. IF there is not a match, the packet is ignored. If there is a match, then the remaining 8 bits are compared.

In operation, the server typically provides the set top terminal with a transport stream that may contain programming data for 10 different set top terminals (known as a neighborhood). As such, the transport depacketizer effectively produces a 10 to 1 data reduction, e.g., 1 out of every 10 program stream packets are decoded and the remainder are rejected. Under normal conditions, this results in each set top terminal processing a 2.6 Mbps channel of data. However, if a high bandwidth channel is required for a certain programming event, the server need only send more programming PID codes addressed to a particular set top terminal for that terminal to receive the higher band width channel. In other words, if a bandwidth doubling is required (e.g., 5.2 Mbps), then rather than having 1 out of 10 packets addressed to the set top terminal, 2 out of 10 packets would be addressed to a particular set top terminal. As such, a particular program would receive a doubling in effective bandwidth.

The command channel transport depacketizer 120 has a similar form as that shown in FIG. 2. However, as depicted in the block diagram of FIG. 3, the PID register is replaced with TID and broadcast TID registers 304. These registers contain TID codes to facilitate the depacketizer 120 searching for data blocks carrying a TID address corresponding to the particular terminal. In addition, all terminals utilize a broadcast TID to enable the service provider to send global instructions to all set top terminals. Thus, a terminal will receive and process any commands having the TID or the broadcast TID. To control processing of data blocks, the comparator 308 is coupled to the enable port of the D flip-flop 310. As such, the comparator controls activation and deactivation of the D flip-flop 310. The control logic 306 that is coupled to the header separator 302 and the TID comparator 308 contains counter circuit 312 that is preset with a value contained in the length designator of each data block. The counter circuit then counts down as bits in the data block are clocked through the shift register 300. When the counter attains zero, the depacketizer captures the next address for TID comparison and resets the counter with the new length designator value. If the data blocks are of fixed length, then a counter circuit may not be necessary and the control logic simply enables the comparison process every predefined number of bits. Additionally, to increase the comparison speed, the TID comparison is accomplished in two steps, e.g., two 8 bit comparisons.

Although various embodiments which incorporate the teachings of the present invention have been shown and described in detail herein, those skilled in the art can readily devise many other varied embodiments that still incorporate these teachings.

What is claimed is:
1. Subscriber apparatus for use in a system for interactively communicating with an information service provider, said apparatus comprising:
   a radio frequency (RF) terminal;
   a diplexer, having a single feed path and coupled to said RF terminal, for coupling an RF signal from said RF terminal to an output, and for coupling a back channel control signal to said RF terminal from an input;
   an information channel receiver, coupled to said diplexer output, for receiving, via an information channel, information services from said information service provider;
   a command channel receiver, coupled to said diplexer output, for receiving, via a command channel, command information from said information service provider;
   a back channel transmitter, coupled to said diplexer input, for providing said back channel control signal;
   a controller, coupled to said information channel receiver, command channel receiver and back channel transmitter, for controlling information transactions with said information service provider;

a depacketizer, coupled to said command channel receiver, for depacketizing a transport stream containing a series of transport stream packets, examining a terminal identification (TID) included in each of said transport stream packets, and passing to an output those packets having an appropriate TID; and a decoder, coupled to said depacketizer, for decoding said packets having an appropriate TID.

2. The subscriber apparatus of claim 1, wherein said command channel receiver comprises:

a tuner, coupled to said diplexer output, for selecting a command channel frequency associated with said subscriber apparatus; and a demodulator, coupled to said command channel tuner, for extracting command information present on said selected command channel frequency.

3. The subscriber apparatus of claim 2, wherein said information channel receiver comprises:

a tuner, coupled to said diplexer output, for selecting an information channel frequency associated with said subscriber apparatus; and a demodulator, coupled to said information channel tuner, for demodulating provider information present on said selected information channel frequency to produce an intermediate frequency (IF) signal.

4. The subscriber apparatus of claim 3, further comprising:

an analog television signal demodulator, coupled to said information channel demodulator, for demodulating said IF signal if said IF signal is an analog television signal; and a digital information signal demodulator, coupled to said information channel demodulator, for extracting information addressed to said subscriber apparatus from said IF signal if said IF signal is a digital information signal.

5. The subscriber apparatus of claim 4, wherein said analog television signal is one of an NTSC, PAL or SECAM television signals.

6. The subscriber apparatus of claim 4, wherein said digital television signal is a QAM signal transporting a information stream.

7. The subscriber apparatus of claim 1, wherein:

said information channel, said control channel and said back channel occupy mutually exclusive spectral regions.

8. The subscriber apparatus of claim 7, wherein:

said information channel occupies a spectral region of approximately 50 MHz to 750 MHz; and said back channel occupies a spectral region of approximately 15 MHz to 30 MHz.

9. The subscriber apparatus of claim 7, wherein:

said information channel is one of a plurality of standard bandwidth information channels, each of said plurality of information channels delivering either a standard analog television signal or a standard digital information signal.

10. The subscriber apparatus of claim 7, wherein:

said information provider comprises a head end of a cable television distribution system.

11. The subscriber apparatus of claim 1, wherein:

said controller, in response to a subscriber instruction produced by an input device, evaluates said instruction to determine if said instruction relates to a local function or a remote function; and in the case of said instruction relating to a remote function, said controller causes said back channel transmitter to transmit said instruction to said provider.

12. The subscriber apparatus of claim 1, wherein said back channel transmitter comprises:

a binary phase shift keying (BPSK) modulator, coupled to said controller, for BPSK modulating an instruction received from said controller;

a mixer, coupled to said controller, for upconverting said BPSK modulated instruction to a frequency determined by said controller; and a controllable amplifier, coupled to said mixer, for controlably amplifying said upconverted BPSK signal, said controllable amplifier controlled by said controller in response to control information received via said control channel.

13. Apparatus for use in a system for interactively communicating with an information service provider, said apparatus comprising:

a radio frequency (RF) terminal;

a diplexer, having a single feed path and coupled to said RF terminal, for coupling an RF signal from said RF terminal to an output, and for coupling a back channel control signal to said RF terminal from an input;

an information channel receiver, coupled to said diplexer output, for receiving, via an information channel, information services from said information service provider;

a back channel transmitter, coupled to said diplexer input, for providing said back channel control signal;

a controller, coupled to said information channel receiver, command channel receiver and back channel transmitter, for controlling information transactions with said information service provider;

a depacketizer, coupled to said information channel receiver, for depacketizing a transport stream containing a series of transport stream packets, examining a packet identification (PID) included in each of said transport stream packets, and selectively generating a clock signal for decoding those packets having an appropriate PID; and a decoder, coupled to said depacketizer, for using said clock signal for decoding said packets having an appropriate PID.

14. The apparatus of claim 13, wherein said PID comprises a terminal identification (TID), said TID having a bit length less than a bit length normally associated with a PID included in a transport stream packet.

15. A subscriber-side method for exchanging information with an information provider in an interactive information distribution system, said distribution system comprising a single communication element supporting an information channel, a control channel and a back channel, said subscriber-side method comprising:

receiving, via a single feed diplexer, said information channel and said command channel;

coupling said information channel and said command channel to respective receivers;

retrieving, from said information channel, provider information having an appropriate terminal identifier, said terminal identifier being one of a predetermined terminal identifier or a terminal identifier retrieved from said command channel, wherein said retrieving step comprises depacketizing a transport stream provided by said information channel, examining each packet of said depacketized transport stream, comparing a terminal identification (TID) included each transport stream packet to a local TID, and decoding those packets having a matching TID; and transmitting, via said single feed diplexer, back channel instructions to said information provider.

16. A subscriber-side method for exchanging information with an information provider in an interactive information distribution system, said distribution system comprising a single communication element supporting an information channel, a control channel and a back channel, said subscriber-side method comprising:

receiving, via a single feed diplexer, said information channel and said command channel;

coupling said information channel and said command channel to respective receivers;

retrieving, from said information channel, provider information having an appropriate terminal identifier, said terminal identifier being one of a predetermined terminal identifier or a terminal identifier retrieved from said command channel, wherein said retrieving step comprises:

depacketizing a transport stream provided by said information channel, examining each packet of said depacketized transport stream, comparing a packet identification (PID) included each transport stream packet to a local PID;

generating, for each PID that matches the local PID, a clock signal; and decoding, using the clock signal, those packets having a matching PID.

17. The subscriber apparatus of claim 13, wherein said depacketizer comprises:

a shift register for buffering said transport stream;

a header separator, coupled to said shift register, for extracting a transport header having a PID from said transport stream;

a PID comparator, coupled to said header separator, for producing an enable signal if said PID is equal to a program identification code associated with a program received by the subscribe r apparatus; and a flip-flop , coupled to said PID comparator, for passing said transport stream to said decoder upon receipt of said enable signal.

18. The subscriber apparatus of claim 13, further comprising:

an analog television signal demodulator, coupled to said information channel demodulator, for demodulating said IF signal if said IF signal is an analog television signal; and a digital information signal demodulator, coupled to said information channel demodulator, for extracting information addressed to said subscriber apparatus from said IF signal if said IF signal is a digital information signal.

19. The subscriber apparatus of claim 13, wherein:

said information channel, said control channel and said back channel occupy mutually exclusive spectral regions.

20. The subscriber apparatus of claim 19, wherein:

said information channel occupies a spectral region of approximately 50 MHz to 750 MHz; and said back channel occupies a spectral region of approximately 15 MHz to 30 MHz.

21. The subscriber apparatus of claim 19, wherein:

said information channel is one of a plurality of standard bandwidth information channels, each of said plurality of information channels delivering either a standard analog television signal or a standard digital information signal.

22. The subscriber apparatus of claim 13, wherein:

said controller, in response to a subscriber instruction produced by an input device, evaluates said instruction to determine if said instruction relates to a local function or a remote function; and in the case of said instruction relating to a remote function, said controller causes said back channel transmitter to transmit said instruction to said provider.

23. The subscriber apparatus of claim 13, wherein said back channel transmitter comprises:

a binary phase shift keying (BPSK) modulator, coupled to said controller, for BPSK modulating an instruction received from said controller;

a mixer, coupled to said controller, for upconverting said BPSK modulated instruction to a frequency determined by said controller; and a controllable amplifier, coupled to said mixer, for controlably amplifying said upconverted BPSK signal, said controllable amplifier controlled by said controller in response to control information received via said control channel.

* * * * *

UNITED STATES PATENT AND TRADEMARK OFFICE
CERTIFICATE OF CORRECTION

PATENT NO. : 6,226,794 B1 Page 1 of 1
APPLICATION NO. : 08/950505
DATED : May 1, 2001
INVENTOR(S) : Bruce J. Anderson, Jr. et al.

It is certified that error appears in the above-identified patent and that said Letters Patent is hereby corrected as shown below:

IN THE CLAIMS

Column 9, line 45 of the issued patent: change "said control channel" to --said command channel--.

Column 10, lines 15-16 of the issued patent: change "said control channel" to --said command channel--.

Column 10, lines 31-33 of the issued patent: change "command channel receiver, and back channel transmitter" to --a command channel receiver, and said back channel transmitter--.

Column 10, line 54 of the issued patent: change "a control channel" to --a command channel--.

Column 11, line 12 of the issued patent: change "a control channel" to --a command channel--.

Column 12, line 11 of the issued patent: change "said control channel" to --a command channel--.

Column 12, lines 47-48 of the issued patent: change "said control channel" to --a command channel--.

Signed and Sealed this

Eighth Day of December, 2009

David J. Kappos
*Director of the United States Patent and Trademark Office*